US009650127B2

(12) United States Patent
Khorrami

(10) Patent No.: US 9,650,127 B2
(45) Date of Patent: May 16, 2017

(54) STRETCHABLE MESH FOR CAVITY NOISE REDUCTION

(71) Applicant: The United States of America as represented by the Administrator of the National Aeronautics and Space Administration, Washington, DC (US)

(72) Inventor: Mehdi R. Khorrami, Norfolk, VA (US)

(73) Assignee: THE UNITED STATES OF AMERICA AS REPRESENTED BY THE ADMINISTRATION OF THE NATIONAL AERONAUTICS AND SPACE ADMINISTRATION, Washington, DC (US)

( * ) Notice: Subject to any disclaimer, the term of this patent is extended or adjusted under 35 U.S.C. 154(b) by 371 days.

(21) Appl. No.: 14/203,750

(22) Filed: Mar. 11, 2014

(65) Prior Publication Data

US 2016/0068260 A1 Mar. 10, 2016

Related U.S. Application Data

(60) Provisional application No. 61/779,031, filed on Mar. 13, 2013.

(51) Int. Cl.
*B64C 25/16* (2006.01)
*B64C 25/12* (2006.01)
*B64C 25/00* (2006.01)

(52) U.S. Cl.
CPC .............. *B64C 25/12* (2013.01); *B64C 25/16* (2013.01); *B64C 2025/003* (2013.01)

(58) Field of Classification Search
None
See application file for complete search history.

(56) References Cited

U.S. PATENT DOCUMENTS

| 6,224,012 B1* | 5/2001 | Wooley | ..................... B60F 5/02 244/121 |
|---|---|---|---|
| 8,020,663 B2 | 9/2011 | Sengissen et al. | |
| 8,256,702 B2 | 9/2012 | Piet et al. | |
| 2004/0104301 A1* | 6/2004 | Wickerhoff | ............... B64C 7/00 244/10 |
| 2009/0078821 A1* | 3/2009 | Chow | ....................... B64C 7/00 244/1 N |
| 2010/0108805 A1* | 5/2010 | Piet | .......................... B64C 25/16 244/1 N |
| 2010/0122869 A1* | 5/2010 | Sengissen | ............. B64C 23/005 181/264 |

(Continued)

OTHER PUBLICATIONS

Mitsuhiro Murayama, Yuzuru Yokokawa, and Kazuomi Yamamoto; "Computational Study on Noise Generation From a Two-wheel Main Landing Gear," 28th International Congress Of The Aeronautical Sciences, Sep. 23-28, 2012, pp. 1-14, Brisbane, Australia.

(Continued)

*Primary Examiner* — Elizabeth A Quast
(74) *Attorney, Agent, or Firm* — Robin W. Edwards

(57) ABSTRACT

A stretchable mesh material extends across the opening of a cavity of the landing gear of an aircraft when the landing gear is in the deployed position. The mesh material alters the flow of air across the opening of the landing gear cavity and significantly reduces the amount of noise produced by the wheel well at low-to-mid frequencies.

15 Claims, 7 Drawing Sheets

(56) References Cited

U.S. PATENT DOCUMENTS

| | | | | |
|---|---|---|---|---|
| 2010/0155529 A1* | 6/2010 | Chow | ............... | B64C 7/00 244/1 N |
| 2011/0139926 A1* | 6/2011 | Chow | ............... | B64C 25/10 244/1 N |
| 2011/0233325 A1* | 9/2011 | Kramer | ............... | B64B 1/08 244/30 |
| 2011/0309193 A1* | 12/2011 | Seror Goguet | ............... | B64C 25/16 244/100 R |
| 2012/0097791 A1 | 4/2012 | Turner et al. | | |
| 2012/0153086 A1 | 6/2012 | Khorrami et al. | | |
| 2013/0119198 A1* | 5/2013 | Campbell | ............... | B64C 1/00 244/118.5 |
| 2015/0083857 A1* | 3/2015 | Simonneaux | ............... | B64C 25/16 244/102 R |
| 2016/0031549 A1* | 2/2016 | Patience | ............... | B64C 21/02 181/286 |

OTHER PUBLICATIONS

Clarence W. Rowley and David R. Williams; "Dynamics and Control of High-Reynolds-Number Flow Over Open Cavities," Annu. Rev. Fluid Mech., 2006. vol. 38, pp. 251-276.

Louis N. Cattafesta III, Qi Song, David R. Williams, Clarence W. Rowley, and Farrukh S. Alvi, "Active Control of Flow-Induced Cavity Oscillations," Progress in Aerospace Sciences, 2008, vol. 44, pp. 479-502.

Louis N. Cattafesta III, David R. Williams, Clarence W. Rowley, and Farrukh S. Alvi, "Review of Active Control of Flow-Induced Cavity Resonance," 33rd AIAA Fluid Dynamics Conference and Exhibit, AIAA Paper No. 2003-3567, Jun. 23-26, 2003, pp. 1-20. Orlando, Florida.

Hidemi Takahashi, Fei Liu, Miguel Palaviccini, Matias Oyarzun, John Griffin, Lawrence Ukeiley, and Louis Cattafesta, "Progress on Active Control of Open Cavities," 49th AIAA Aerospace Sciences Meeting including the New Horizons Forum and Aerospace Exposition, AIAA Paper No. 2011-1221, Jan. 4-7, 2001, pp. 1-16, Orlando Florida.

Hanno H. Heller and Donald B. Bliss, "The Physical Mechanism of Flow-Induced Pressure Fluctuations in Cavities and Concepts for Their Suppression," AIAA 2nd Aero-Acoustics Conference, AIAA Paper No. 75-491, Mar. 24-26, 1975, pp. 1-8, Hampton, VA.

V. Sarohia and P. F. Massier, "Control of Cavity Noise," 3rd AIAA Aero-Acoustics Conference, AIAA paper No. 76-528, Jul. 20-23, 1976, pp. 1-9, Pasadena, California.

* cited by examiner

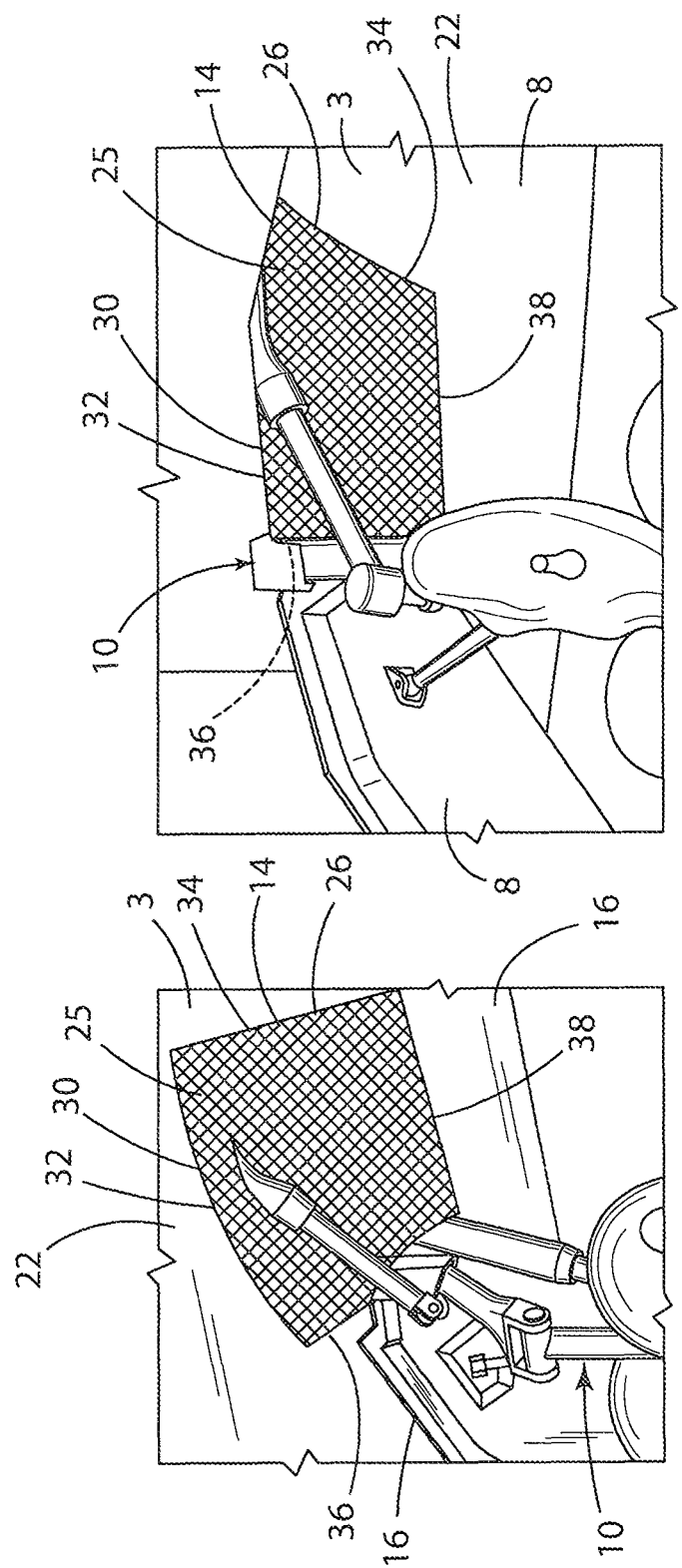

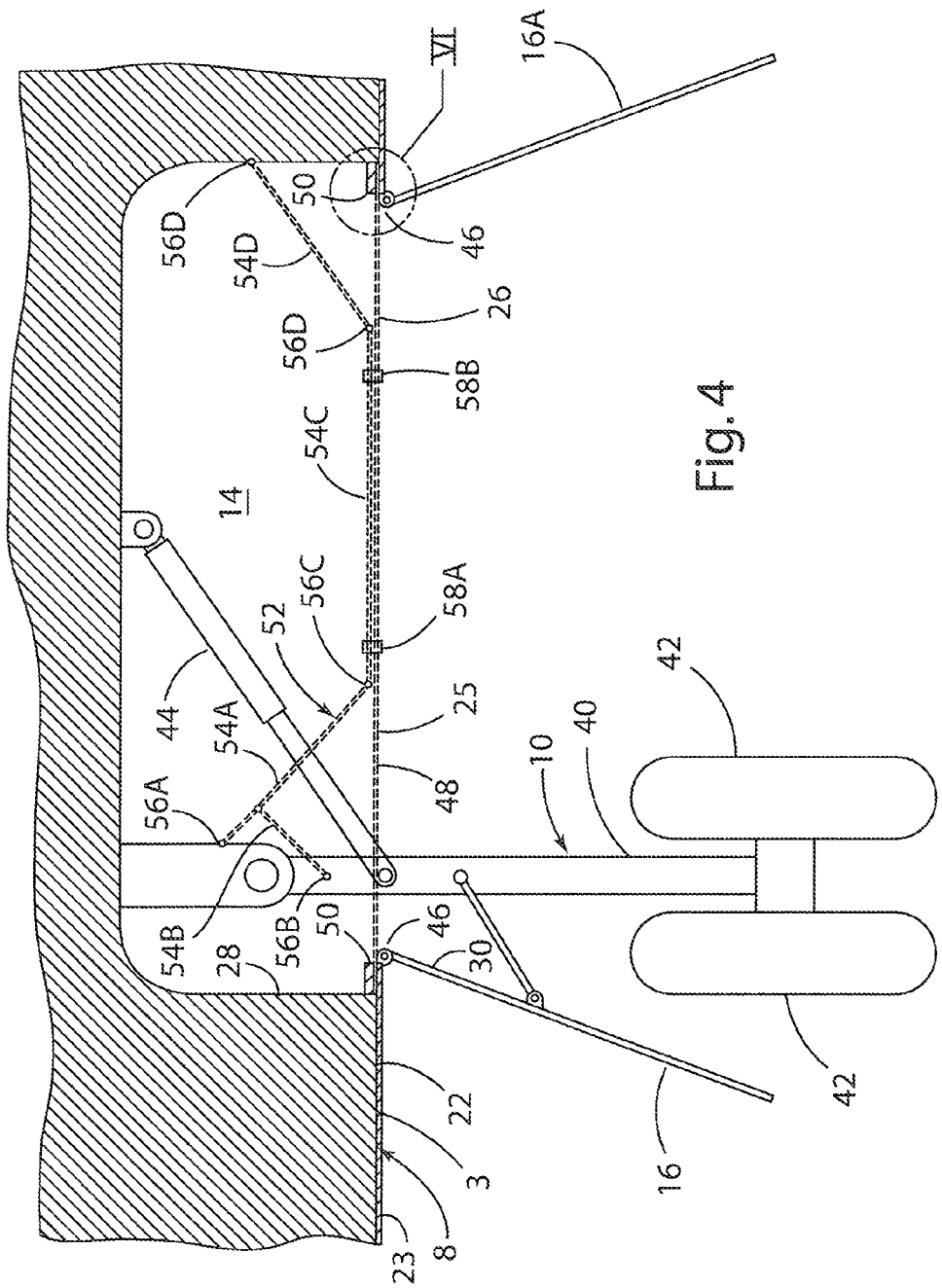

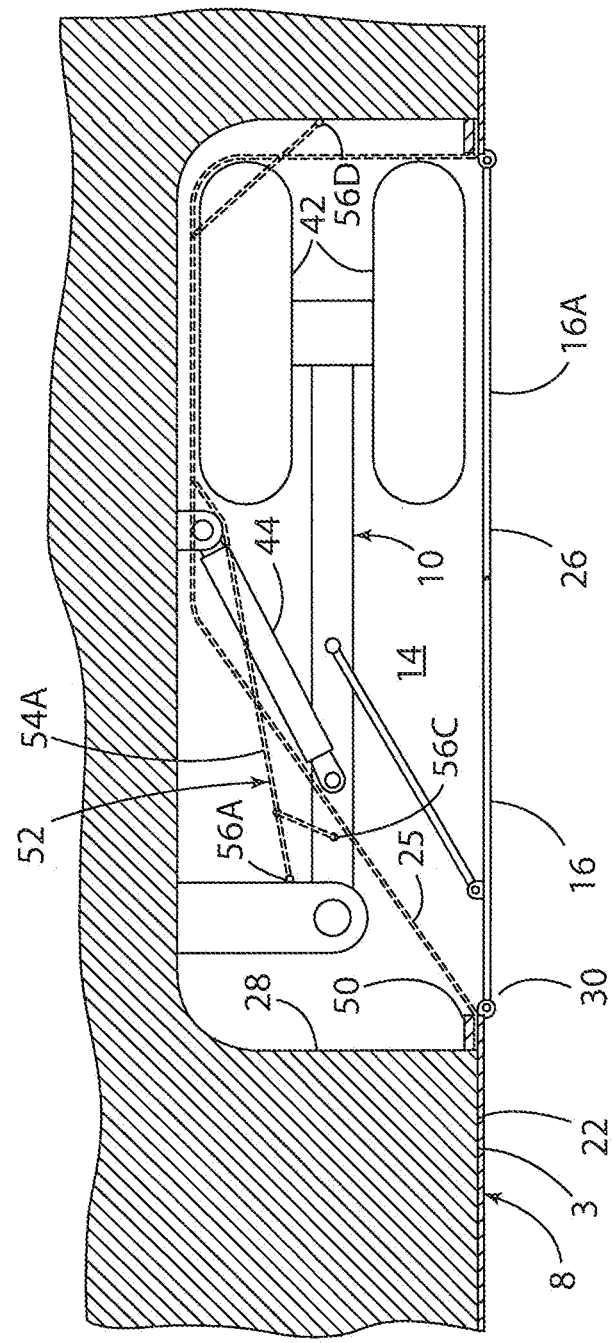

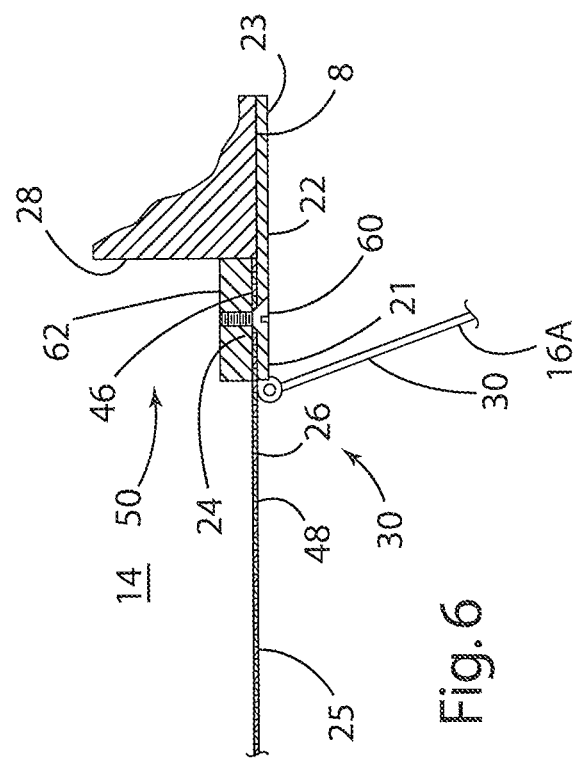

STRETCHABLE MESH FOR CAVITY NOISE REDUCTION

CROSS-REFERENCE TO RELATED APPLICATION

This application claims the benefit of and priority to U.S. Provisional Application Ser. No. 61/779,031, titled "STRETCHABLE MESH FOR CAVITY NOISE REDUCTION (SMeCNoR), filed on Mar. 13, 2013, the entire contents of which are incorporated herein by reference.

STATEMENT REGARDING FEDERALLY SPONSORED RESEARCH OR DEVELOPMENT

The invention described herein was made by an employee of the United States Government and may be manufactured and used by or for the Government of the United States of America for governmental purposes without the payment of any royalties thereon or therefore.

BACKGROUND OF THE INVENTION

Noise produced by unsteady flow around aircraft structures, termed airframe noise, is a significant source of aircraft noise during approach and landing. Sound radiated from the aircraft undercarriage is a major contributor to airframe noise. In many or most instances, noise generated by landing gear is dominated by cavity (wheel well) noise at low-to mid-frequencies.

Various approaches have been utilized in an attempt to reduce noise generated by aircraft undercarriage. One approach seeks to reduce noise by hindering the development of large scale structures within the free shear layer and to disrupt their spanwise coherence at the cavity leading edge. Such concepts include leading edge serration, application of micro perforations at the cavity lip, and leading edge deflectors/spoilers. Other known concepts utilize active flow control strategies such as blowing, suction, and micro-actuators.

SUMMARY OF THE INVENTION

The present invention utilizes a membrane such as a mesh that extends over at least a substantial portion of the cavity opening when the landing gear is deployed. The membrane may comprise a stretchable mesh having homogenous mesh spacing of about 1.5 to 3 meshes per inch. The mesh may comprise 80% to 90% of a durable material such as nylon, and the remaining 10% to 20% may be spandex or other suitable stretchable material. However, the membrane could, alternatively, comprise an impermeable sheet of material. The impermeable sheet may be stretchable (elastomeric), or the impermeable sheet may be substantially non-stretchable.

One aspect of the present invention is a landing gear structure for aircraft including an aircraft structure forming a wheel well or cavity. The aircraft structure has an edge that defines an opening to the cavity. A retractable landing gear assembly moves from a stowed configuration substantially within the cavity to a deployed configuration wherein at least a portion of the landing gear assembly extends out of the cavity. An elastic membrane is secured to the aircraft structure along at least a portion of the edge whereby the elastic membrane extends over at least a substantial portion of the opening when the landing gear assembly is in the deployed configuration. The elastic membrane thereby reduces noise from the landing gear when the landing gear is in the deployed configuration. The elastic membrane may comprise an elastic mesh having homogenous mesh spacing. The mesh spacing may be between about 1.5 to about 3.0 meshes per inch, and the thickness of the mesh may be equal or less than 0.1 inches. The mesh material is preferably flush mounted to an interior surface of the aircraft skin along at least a substantial portion of the leading edge of the cavity.

Another aspect of the present invention is a method of reducing noise generated in connection with a landing gear cavity of an aircraft having a deployable landing gear. The method includes providing an elastic membrane, and securing the elastic membrane to the aircraft. The elastic membrane may comprise a mesh material having a homogenous mesh spacing. The method further includes positioning the elastic membrane so it extends across at least a substantial portion of the opening to the cavity when the landing gear is in a deployed configuration. The elastic membrane preferably extends across the entire opening to the cavity.

These and other features, advantages, and objects of the present invention will be further understood and appreciated by those skilled in the art by reference to the following specification, claims, and appended drawings.

BRIEF DESCRIPTION OF THE DRAWINGS

FIG. 2 is a partially fragmentary isometric view of a portion of an aircraft structure and landing gear showing a stretchable mesh material extending across an opening of a cavity with the landing gear in a deployed configuration;

FIG. 3 is a partially fragmentary isometric view of a portion of the aircraft structure and landing gear of FIG. 2 showing the stretchable mesh material extending across the opening of the cavity with the landing gear in the deployed configuration;

FIG. 4 is a partially schematic cross sectional view of an aircraft structure and landing gear in a deployed configuration showing an elastomeric membrane extending across the opening of the cavity;

FIG. 5 is a partially schematic cross sectional view of the aircraft structure and landing gear of FIG. 4 showing the landing gear in a stowed configuration;

FIG. 6 is an enlarged, fragmentary view of a portion of the stretchable membrane attached to the aircraft structure;

DETAILED DESCRIPTION

Figure 1:
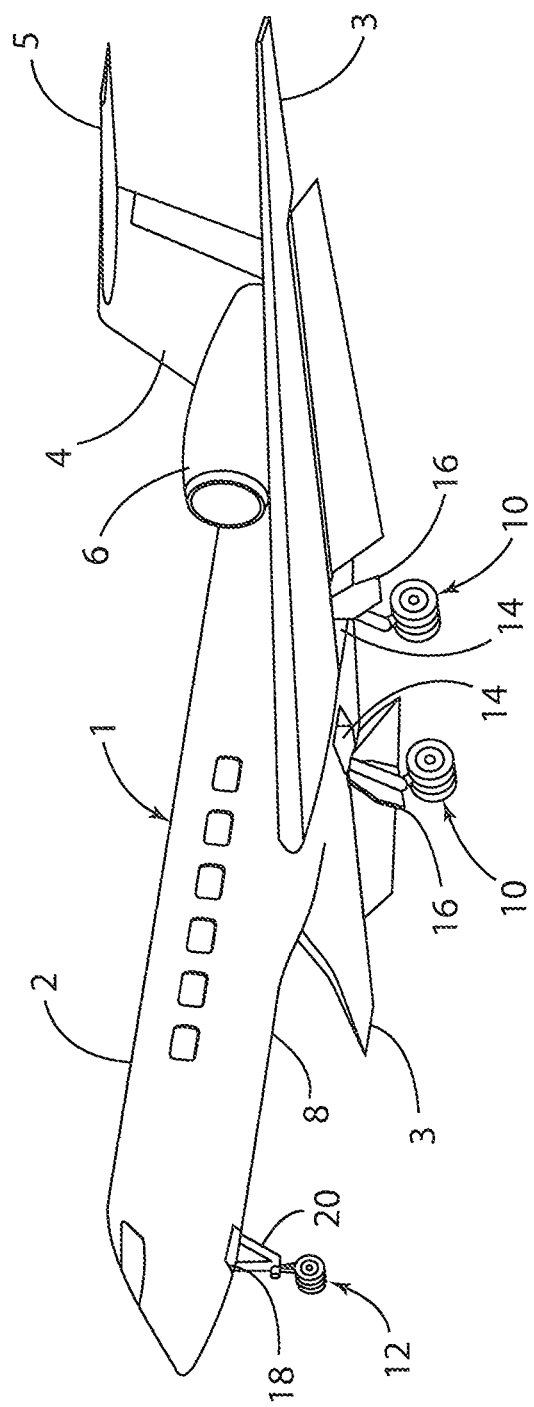
FIG. 1 is an isometric view of an aircraft with undercarriage in a deployed configuration.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, an aircraft 1 includes a fuselage 2, wings 3, a vertical stabilizer 4, and horizontal stabilizers 5. The aircraft 1 also includes a propulsion system such as turbo fan engines 6, propellers (not shown), or other suitable propulsion system.

The aircraft 1 also includes a pair of main landing gear assemblies 10 and a nose gear assembly 12. Main landing gear assemblies 10 retract into cavities 14 when in a stowed or retracted configuration, and nose gear 20 retracts into a cavity 18 when in a stowed or retracted configuration. The cavities 14 and 18 are covered by doors 16 and 20, respectively, in a known manner when the landing gear is retracted to a stowed configuration. It will be understood that the noise reducing stretchable membrane or mesh of the present invention may be utilized with a wide variety of aircraft having deployable landing gear, and the present invention is therefore not limited to the specific landing gear and aircraft configuration shown in FIG. 1.

With further reference to FIGS. 2 and 3, when the landing gear 10 is in a deployed configuration, a membrane 25 extends across opening 26 of cavity 14. A membrane 25 may also extend across the opening of cavity 18 of nose landing gear 12. However, for purposes of the present application, only the membrane 25 at one of the main landing gear assemblies 10 will be described in detail. As discussed in more detail below, the membrane 25 may comprise a stretchable mesh material having homogenous mesh spacing.

In the illustrated example, aircraft structure 8 comprises a wing 3 having a skin structure 23 (FIG. 4) having a lower surface 22. The lower surface 22 intersects an inner surface 28 (see also FIGS. 4 and 5) of cavity 14 to form a peripheral edge 30 extending around opening 26 of cavity 14. The peripheral edge 30 includes a leading edge portion 32, a trailing edge portion 38, and spaced apart side edge portions 34 and 36 that extend between the leading and trailing edge portions 32 and 38. Although the shape of the peripheral edge 30 will depend on the type of aircraft, the peripheral edge 30 will generally include a leading edge portion 32 and other edge portions that are spaced apart from the leading edge portion to form an opening 26 to a cavity 14.

With further reference to FIG. 4, when landing gear 10 is in a deployed configuration, a portion 40 of landing gear 10, including tires 42, is disposed outside of cavity 14, and doors 16 and 16A are in an open configuration. A powered actuator 44 provides for movement of the landing gear assembly 10 from the deployed configuration of FIG. 4 to the stowed configuration of FIG. 5. It will be understood that the landing gear assembly 10 may be substantially the same as known designs.

Referring again to FIG. 4, when the landing gear assembly 10 is in the deployed configuration, the membrane or mesh 25 extends across the opening 26 of cavity 14. The outer edge portion 46 of membrane 25 is secured to the aircraft structure 8 directly adjacent to the peripheral edge 30 of cavity 14. With further reference to FIG. 6, skin structure 23 forms a lip or flange 21 at peripheral edge 30 of cavity 14. Membrane 25 is secured to inner surface 24 of flange 21 utilizing a connector 50 or other suitable arrangement such that the outer surface 48 of membrane 25 is preferably flush or approximately flush with outer surface 22 of skin structure 23 forming flange 62.

The mesh 25 may be operably connected to the landing gear assembly 10 by a guide/support assembly 52 that moves the membrane 25 inwardly when the landing gear assembly 10 is in the stowed configuration (FIG. 5). Support assembly 52 is configured to move/support membrane 25 to ensure that membrane 25 does not become entangled on landing gear 10 and/or aircraft structure 8. The support assembly 52 may comprise a plurality of links 54A-54D that are pivotally interconnected to one another and/or to landing gear assembly 10 and/or to aircraft structure 8 at a plurality of connection points 56A-56D. The membrane or mesh 25 may be secured to the support assembly 52 by hooks or other connectors 58A and 58B. The support assembly 52 is shown in schematic form in FIGS. 4 and 5, and it will be understood that the support assembly 52 may comprise various links, slides, and other components that are operably interconnected to one another and/or to landing gear 10 and/or aircraft structure 8 as required for a particular application. The support assembly 52 ensures that the membrane 25 moves to a stowed configuration (FIG. 5) without becoming entangled or otherwise damaged due to contact with landing gear assembly 10 and/or portions of aircraft structure 8. In the stowed configuration (FIG. 5) the membrane 25 is preferably relaxed/loose. Alternatively, the membrane 25 may be stretched/tensioned a very small amount when stowed (FIG. 5) relative to the fully tensioned condition the membrane 25 is in when the landing gear 10 is deployed (FIG. 4). The support assembly 52 may be configured as required for a particular application to provide a relaxed stowed configuration and tensioned deployed configuration of membrane 25.

With reference to FIG. 6, edge portion 46 of membrane 25 is secured to lip 21 of skin structure 23 of aircraft structure 8 utilizing a connector 50. In the illustrated example, the connector 50 comprises an elongated strip 62 of lightweight material such as aluminum that is secured to the inner surface 24 of lip 21 utilizing a plurality of mechanical fasteners 60. The elongated strip 62 may include hooks (not shown) or other suitable connectors to attach the membrane 25 to strip 62. The membrane 25 is preferably secured to the entire peripheral edge 30 at opening 26 to cavity 14 or to at least a substantial portion of the peripheral edge 30 such that the membrane 25 extends across most of the opening 26 of cavity 14. However, depending upon the configuration of the landing gear 10, cavity 14, and aircraft structure 8, in some cases it may not be possible to secure the entire edge portion 46 of membrane 25 to the aircraft structure 8. Nevertheless, edge portion 46 of membrane 25 is preferably secured to peripheral edge 30 along at least a substantial portion of the leading edge 32 (FIGS. 2 and 3).

The membrane 25 is preferably stretched when landing gear 10 is deployed (FIG. 4) to improve the performance of the membrane 25 with respect to noise reduction and to ensure that the membrane 25 does not experience excessive movement in use. The amount of stretching will vary depending upon the type of membrane 25 utilized and the requirements of a particular application. In general, membrane 25 is stretched an amount that is sufficient to keep the membrane 25 relatively firm as unsteady airflow passes over opening 26 of cavity 14 in flight. However, membrane 25 is preferably not stretched when landing gear 10 is stowed (FIG. 5) to ensure that the membrane 25 is not damaged.

Figure 7:
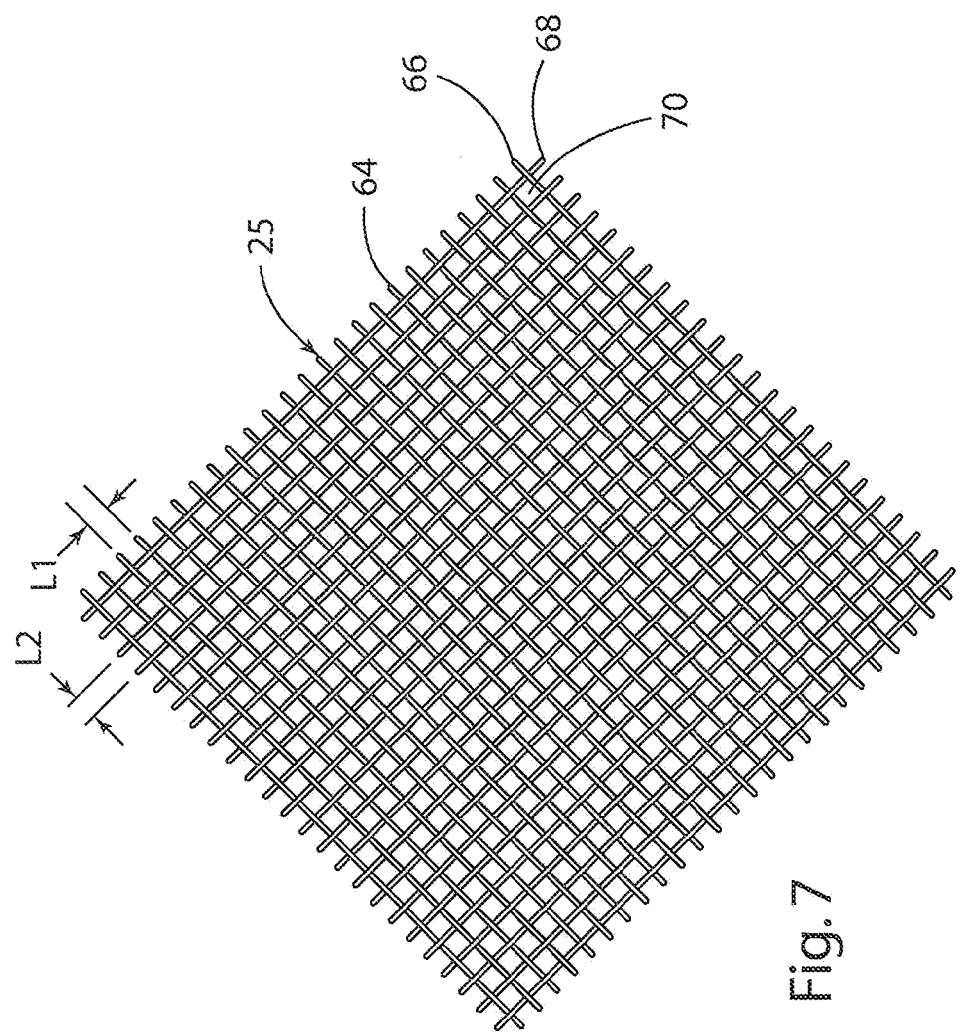
FIG. 7 shows a stretchable mesh according to one aspect of the present invention.

With further reference to FIG. 7, membrane 25 may comprise a woven mesh material 64 having a plurality of first strands 66 that extend transverse to second strands 68 to form a plurality of openings 70. The strands 66 have a mesh spacing "L1", and strands 68 have a mesh spacing "L2". The mesh spacings L1 and L2 may be equal to one another, and the strands 66 may be orthogonal to the strands 68 such that openings 70 have a generally square shape. If the mesh spacings L1 and L2 are equal to one another to provide a homogenous mesh spacing, a mesh spacing between about 1.5 to about 3.0 meshes per inch may be utilized. However, mesh 64 need not have homogenous spacing, and the mesh spacing may vary depending upon the requirements of a particular application. The maximum thickness of mesh 64 is preferably no greater than about 0.1 inches. The strands 66 and 68 may have substantially the same composition, and may comprise, for example, 80% to 90% of a durable material such as nylon, and the remaining 10% to 20% may be spandex or other suitable stretchable material.

The membrane 25 may comprise a stretchable mesh 64 having a plurality of openings 70 as discussed above. However, the membrane 25 may comprise an impermeable membrane such as a sheet of polymer or elastomeric material. For example, the membrane 25 may comprise a mesh material 64 that is bonded to a sheet of impermeable elastic material, or the membrane 25 may comprise fibers that are embedded in an elastomeric material. Alternatively, the membrane 25 may comprise a sheet of polymer or elastomeric material that is not reinforced with fibers.

When aircraft 1 (FIG. 1) is in flight, a boundary layer forms adjacent to the aircraft structure 8. As the boundary layer over the surface 22 of wing 3 separates at the leading edge 32 of cavity 14, the presence of the membrane 25 (e.g. mesh 64) at the cavity opening 26 promotes growth of 3-dimensional flow structures within the free shear layer. The finer flow structure that is generated by the membrane 25/mesh 64 reduces the shear layer roll-up process and thus eliminates the spanwise coherence of the large-scale flow structures immediately downstream of the leading edge 32. Also, the finer 3-dimensional flow structures introduced by the membrane 25/mesh 64 decay rapidly due to viscous diffusion, giving rise to a fairly diffused shear layer devoid of any coherent flow structures. As a result, the sharp edge at the trailing edge 38 of the cavity opening 26 experiences only low amplitude quasi-random (de-correlated) pressure fluctuations. Consequently, the generation of high amplitude acoustic waves and subsequent maintenance of cavity resonance is either eliminated or highly diminished.

Figure 8:
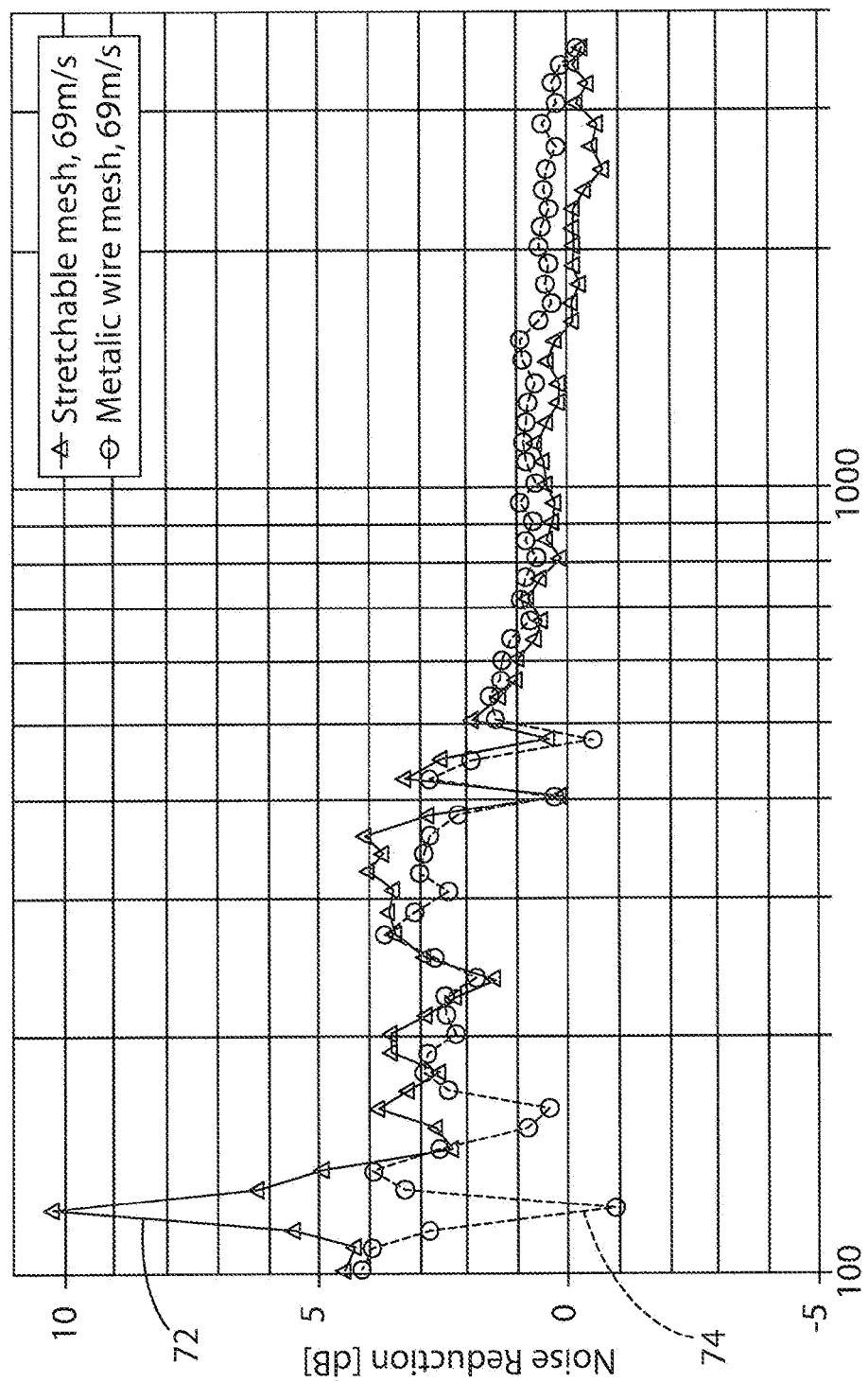
FIG. 8 is a graph showing spectra in flyover direction (from phased array) showing the magnitude of the reduction in sound pressure levels relative to an untreated cavity.

With further reference to FIG. 8, testing of an 18% scale model in a wind tunnel has shown that a stretchable mesh material is capable of substantially reducing landing gear cavity noise. Specifically, the stretchable mesh material reduced gear cavity noise in excess of 1 dB to 3 dB over the frequency range of 100 Hz to 500 Hz and by about 1 dB in the 500 Hz to 800 Hz range. The line 72 in FIG. 8 represents the results for a stretchable mesh 64 having homogenous mesh spacing on the order of about 0.08 inches to about 0.125 inches (corresponding to 8-12 meshes per inch). For test purposes, this mesh spacing was utilized in connection with an 18% scale wind tunnel model. As discussed above, for full scale applications, a mesh spacing between about 1.5 to about 3.0 meshes per inch is presently preferred. However, mesh spacing in the range of about 0.25 meshes per inch to about 10.0 meshes per inch could also be utilized. The dashed line 74 in FIG. 8 represents the noise reduction for an 18% scale model utilizing a non-stretchable metallic wire mesh extending over an opening of a landing gear cavity of an 18% scale model. Although the metallic wire mesh does provide some noise reduction, the stretchable mesh generally provides more noise reduction, particularly in the low-to-mid frequency ranges (i.e. below about 1000 Hz).

The membrane or mesh of the present invention may be incorporated into new aircraft at the time the aircraft is designed. Also, existing aircraft having retractable landing gear may be retrofitted with the stretchable mesh to reduce noise. The stretchable mesh or membrane can be configured for use in a wide variety of aircraft. Although the stretchable mesh has been described in connection with a wheel well of an aircraft, it will be understood that the stretchable mesh may be utilized to reduce noise associated with airflow over other types of openings. For example, aircraft may include openings or orifices that are fluidly connected to air conditioning system ducts. A stretchable mesh may be positioned over such openings to reduce noise generated by these openings.

While preferred embodiments of the present invention are shown and described, it is envisioned that those skilled in the art may devise various modifications of the present invention without departing from the spirit and scope of the appended claims.

The invention claimed is:

1. A landing gear structure for aircraft, comprising:
an aircraft structure forming a cavity, the aircraft structure having an edge defining an opening to the cavity;
a retractable landing gear assembly that moves from a stowed configuration substantially within the cavity to a deployed configuration wherein at least a portion of the landing gear assembly extends out of the cavity; and
an elastic membrane secured to the aircraft structure along at least a portion of the edge, wherein the elastic membrane is configured to extend over at least a substantial portion of the opening when the landing gear assembly is in the deployed configuration and alters air flow across the opening to reduce noise from the opening while the landing gear is in the deployed configuration.

2. The landing gear structure of claim 1, wherein:
the membrane comprises a mesh material.

3. The landing gear structure of claim 2, wherein:
the mesh material includes a plurality of openings disposed in rows.

4. The landing gear structure of claim 3, wherein:
the openings through the mesh material are formed by a plurality of strands of material extending in a first direction and a second direction that is transverse to the first direction.

5. The landing gear structure of claim 4, wherein:
the openings have a homogenous mesh spacing.

6. The landing gear structure of claim 5, wherein:
the mesh spacing is in a range of about 1.5 to about 3.0 meshes per inch.

7. The landing gear structure of claim 5, wherein:
the mesh defines a thickness, and wherein the thickness is about 0.1 inches or less.

8. The landing gear structure of claim 5, wherein:
the strands of material comprise nylon and spandex materials.

9. The landing gear structure of claim 1, wherein:
the elastic membrane promotes growth of three-dimensional flow structures within a free shear layer at the opening of the cavity.

10. The landing gear structure of claim 9, wherein:
the edge defines a leading edge portion, and the three-dimensional flow structures generated by the membrane reduce the shear layer roll-up process and diminish or eliminate spanwise coherence of large-scale flow structures immediately downstream of the leading edge portion.

11. The landing gear structure of claim 1, wherein:
the edge defines a leading edge portion; and
a first portion of the elastic membrane is secured to the aircraft structure along the leading edge portion.

12. The landing gear structure of claim 11, wherein:
a second portion of the elastic membrane is connected to the landing gear assembly and moves with the landing gear assembly as the landing gear is moved between the deployed and stowed configurations.

13. The landing gear structure of claim 1, wherein:
the elastic membrane comprises a substantially impermeable layer of elastomeric material.

14. The landing gear structure of claim 1, wherein:
the elastic membrane comprises a woven fabric.

15. The landing gear structure of claim 7, wherein:
the elastic membrane is pretensioned.

* * * * *